United States Patent [19]

Convertine et al.

[11] 4,017,905
[45] Apr. 12, 1977

[54] TOY RECORDER AND PLAYBACK APPARATUS

[75] Inventors: Frank J. Convertine, Cincinnati, Ohio; John F. Mayer, Fort Thomas, Ky.

[73] Assignee: General Mills Fun Group, Inc., Minneapolis, Minn.

[22] Filed: Oct. 19, 1973

[21] Appl. No.: 408,231

Related U.S. Application Data

[63] Continuation-in-part of Ser. No. 243,165, April 12, 1972, abandoned.

[52] U.S. Cl. .................................. 360/96; 360/62; 360/118
[51] Int. Cl.² ................. G11B 15/10; G11B 15/18; G11B 5/12; G11B 15/12
[58] Field of Search ............ 179/100.2 R; 274/1 A; 242/201, 202; 46/117, 175 AR; 360/96, 118, 62

[56] References Cited

UNITED STATES PATENTS

| | | | |
|---|---|---|---|
| 2,535,498 | 12/1950 | Kornei | 179/100.2 D |
| 3,159,942 | 12/1964 | Fiske | 46/117 |
| 3,162,980 | 12/1964 | Hellman | 46/175 AR |
| 3,528,627 | 9/1970 | Sindlinger | 242/201 |
| 3,792,490 | 2/1974 | Wigal | 360/118 |

*Primary Examiner*—Robert S. Tupper
*Attorney, Agent, or Firm*—L. M. Lillehaugen

[57] ABSTRACT

A miniature tape recorder for use by children. The recorder is normally incorporated in a toy, such as a doll, so that the child can speak to the toy, and thereafter playback, or repeat, the word or phrase spoken. During the record sequence, messages spoken into a microphone positioned within the toy, are recorded on a movable magnetic tape. The tape is caused to move in a first direction by means of a drawstring, and in a second direction by means of a constant force spring motor. During playback, the previously recorded message is reproduced.

11 Claims, 17 Drawing Figures

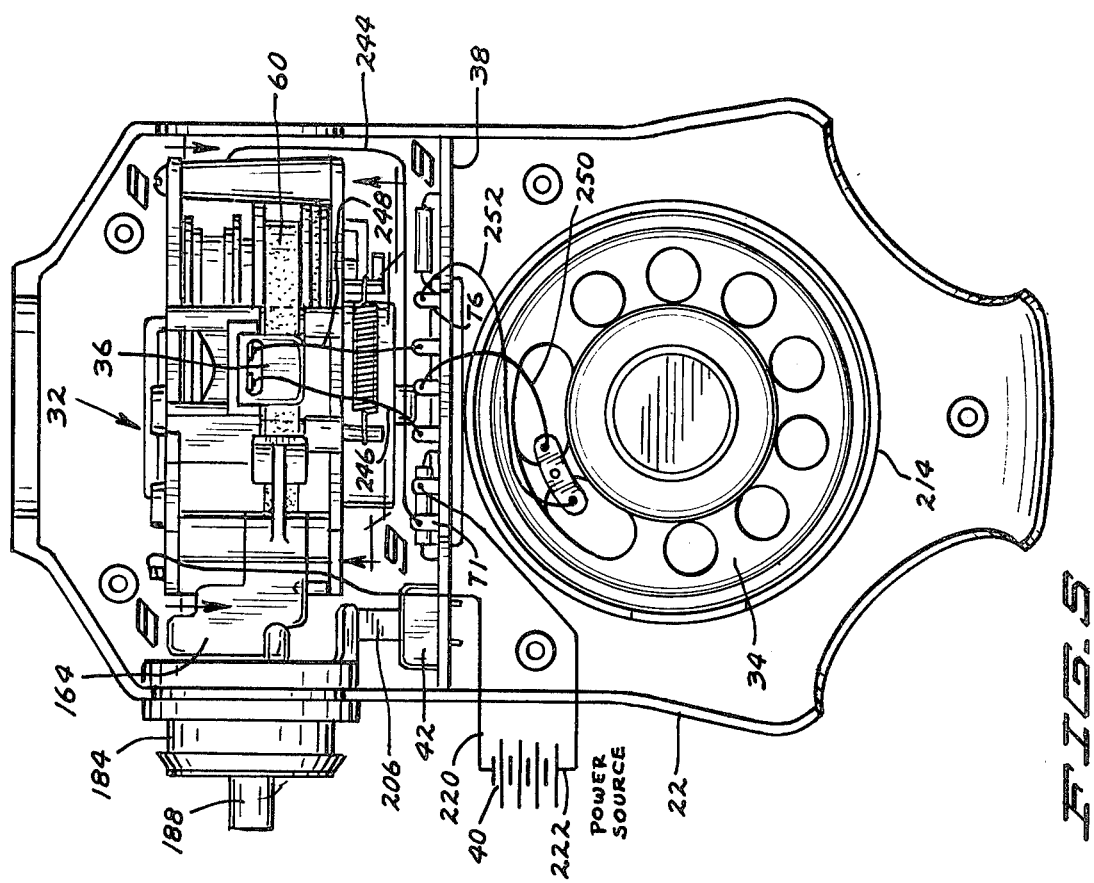
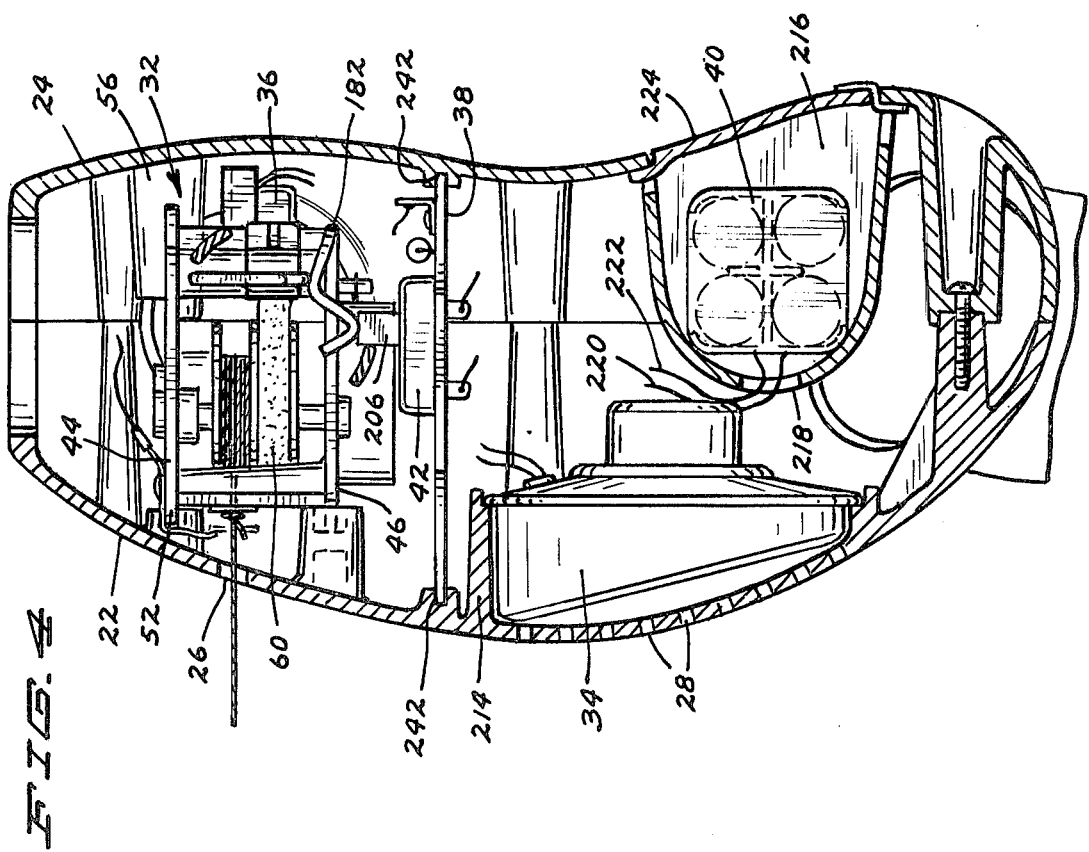

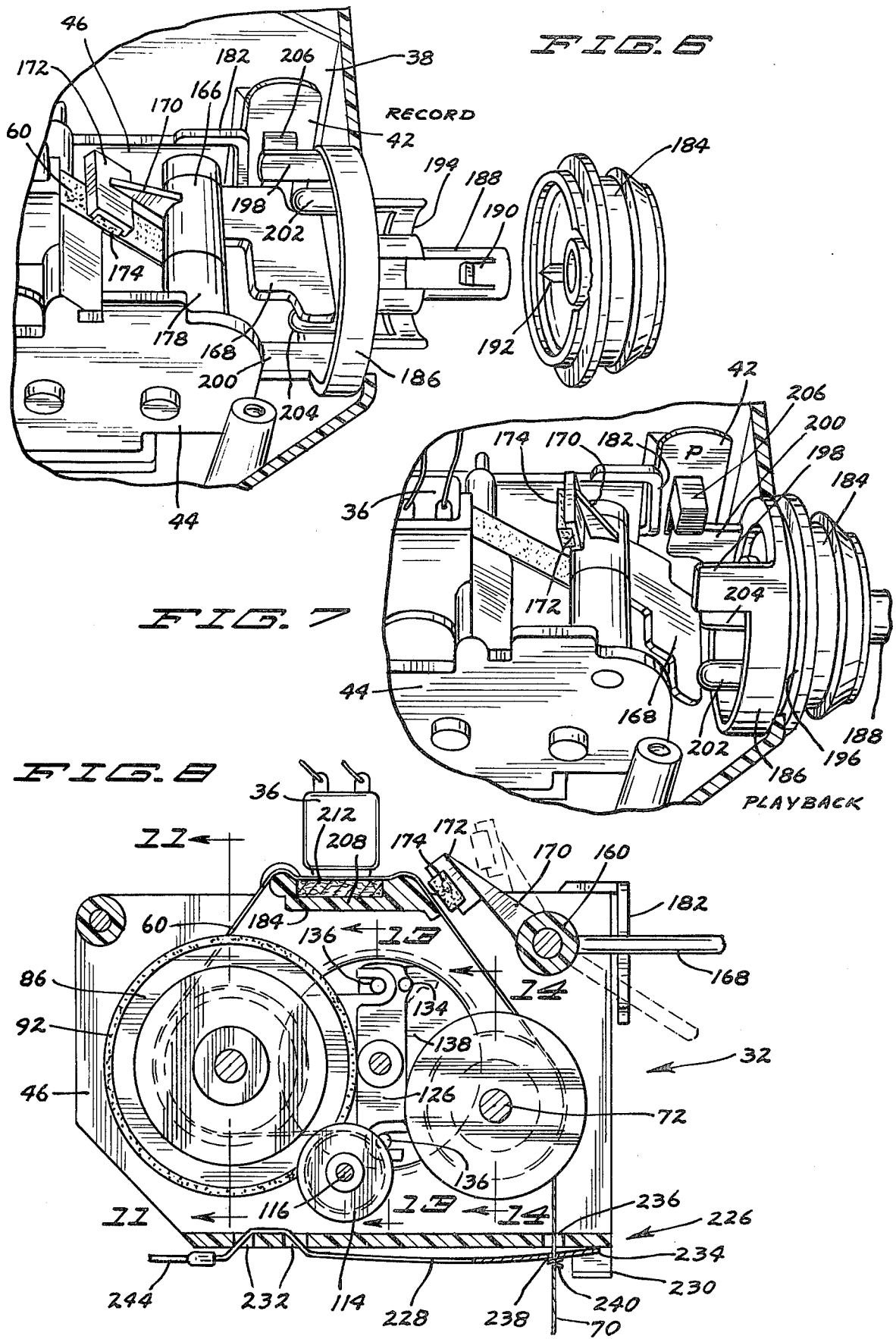

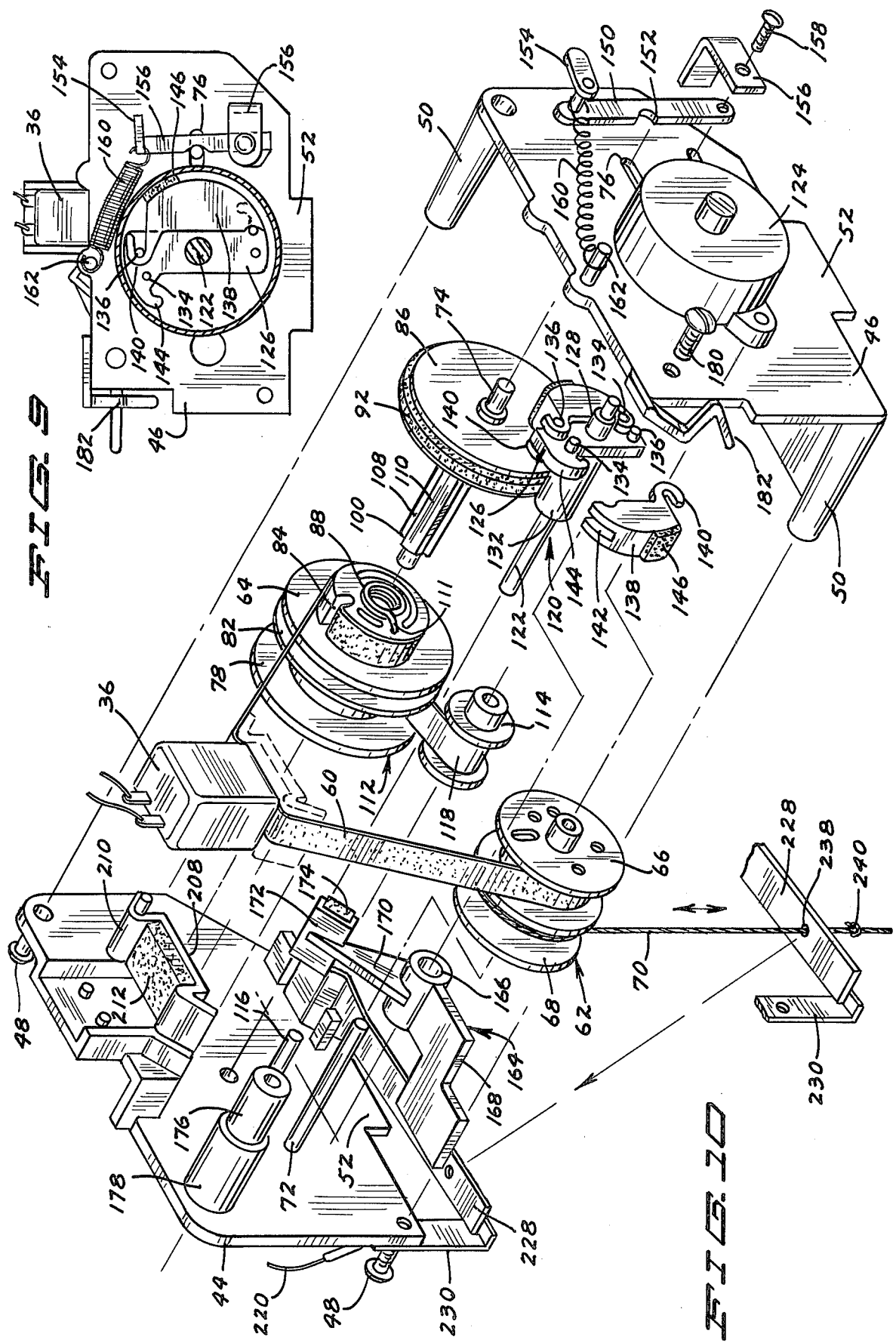

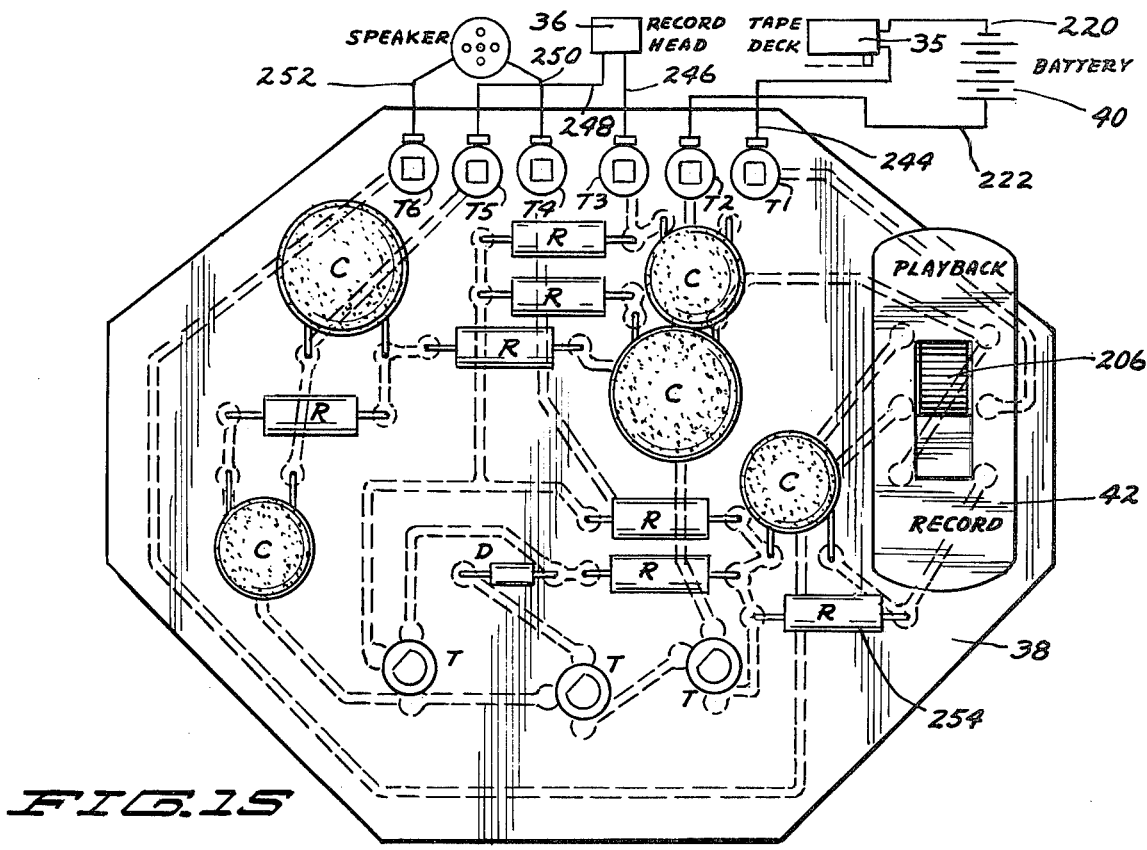
FIG. 15
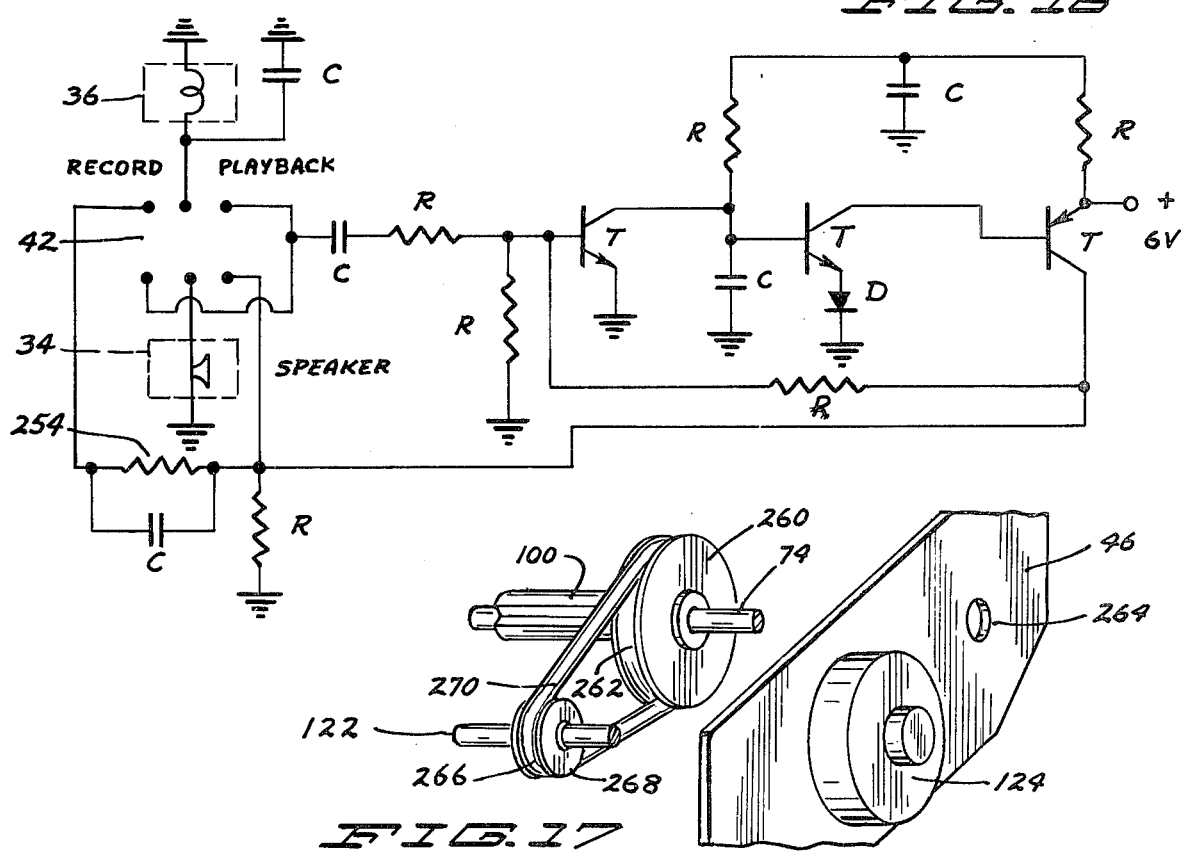
FIG. 16
FIG. 17

TOY RECORDER AND PLAYBACK APPARATUS

This is a continuation-in-part of application Ser. No. 243,165, filed Apr. 12, 1972, now abandoned.

The present invention relates to talking toys, and more specifically to a recording and reproducing apparatus for use with dolls or other toys. The apparatus is adapted to receive and record the human voice, and thereafter repeat or playback, the sound previously recorded.

Toys or figures which talk are generally well known in the art. Perhaps the most well known talking toys are those which include a sound reproducing mechanism having a record, tape, or the like, with one or more different sound sequences prerecorded thereon. In operation, the prerecorded sound sequences are reproduced in either a prescribed sequence, or in a random manner. Such devices have certain disadvantages and shortcomings. Perhaps the biggest disadvantage is that the playback is limited to the specific sound sequence originally recorded, and it is not possible for the reproduced information to be changed without changing the record; quite often this requires disassembling the entire mechanism in order to accomplish a record change.

Another type of talking toy known in the art is one having a mechanism which receives and records a sound sequence, and thereafter repeats or plays back such sound sequence. To the best of applicant's knowledge, devices of this type are provided with a relatively complex electrical system including an electrical motor for driving the sound recording medium, e.g., magnetic tape, past a recording head and a reproducing head, as well as to provide suitable amplification of the sounds recorded and reproduced. Not only are devices of this type relatively complicated, but they are costly to manufacture and repair.

Accordingly, one object of the present invention is to provide an improved apparatus for recording and reproducing sounds.

Another object is to provide a miniature recorder for use with toys, such as dolls, whereby the doll or toy will repeat phrases or sentences spoken to it.

A further object is to provide a toy tape recorder having an improved and simple to operate drive mechanism for imparting movement to a sound carrying medium relative to a recording head and reproducing head.

A still further object is to provide a tape recorder for use in toys which is small and compact in design, which is reliable and rugged in construction in order to withstand repeated use and probable abuse, and which is relatively inexpensive to manufacture and construct.

Another object is to provide a miniature tape recorder for use with toys which requires a minimum amount of electrical power to operate it.

A further object is to provide a tape recorder having a movable recording medium for recording and reproducing sounds, and an improved governor mechanism for controlling the rate of travel of the recording medium.

Other objects and advantages of the invention will become apparent from a consideration of the following specification and accompanying drawings. Before proceeding with a detailed description of the invention however, a brief resume of it will be presented.

Briefly, the invention comprises a recording and reproducing apparatus which includes a mechanical tape deck, an electrical system in combination with the tape deck, a switch mechanism which activates a portion of the tape deck as well as the electrical system, between record and playback. The tape deck in general, supports a magnetic tape which is windable on a pair of reels, an erase mechanism for removing sounds recorded on the tape, and a spring motor for transferring the tape from a wind-up reel onto a storage reel. An improved governor mechanism is also provided for controlling the rate of travel of the magnetic tape. The electrical system generally includes a microphone-loudspeaker device, a combined record-reproduce head, a transistorized amplifier mounted on a circuit board, and a power source for energizing the electrical system.

The invention will best be understood by reference to the following drawings, wherein:

FIG. 4 is a side elevational view of the invention taken through the center of the body, but illustrating the components in elevation;

FIG. 5 is a rear elevational view of the doll shown in FIG. 4, with the rear portion of the doll's torso removed.

FIG. 6 is a partial perspective view which depicts a cam structure for activating a switch mechanism for the electrical components, as well as an erase mechanism used in conjunction with a magnetic tape, in a first operating condition;

FIG. 7 is a perspective view similar to FIG. 6, but showing the components in a different operating condition;

FIG. 8 is a front (or top) elevational view, in partial section, of the tape recorder taken along line 8—8 of FIG. 5;

FIG. 9 is a rear (or bottom) elevational view taken along line 9—9 of FIG. 5;

FIG. 10 is an exploded perspective view of the tape recorder which shows the relationship of the various components with respect to each other;

FIG. 15 is a plan view of a circuit board employed in the invention;

FIG. 16 is an electrical circuit diagram of the circuit utilized for amplifying the sound; and FIG. 17 illustrates another embodiment of the invention.

Figure 1:
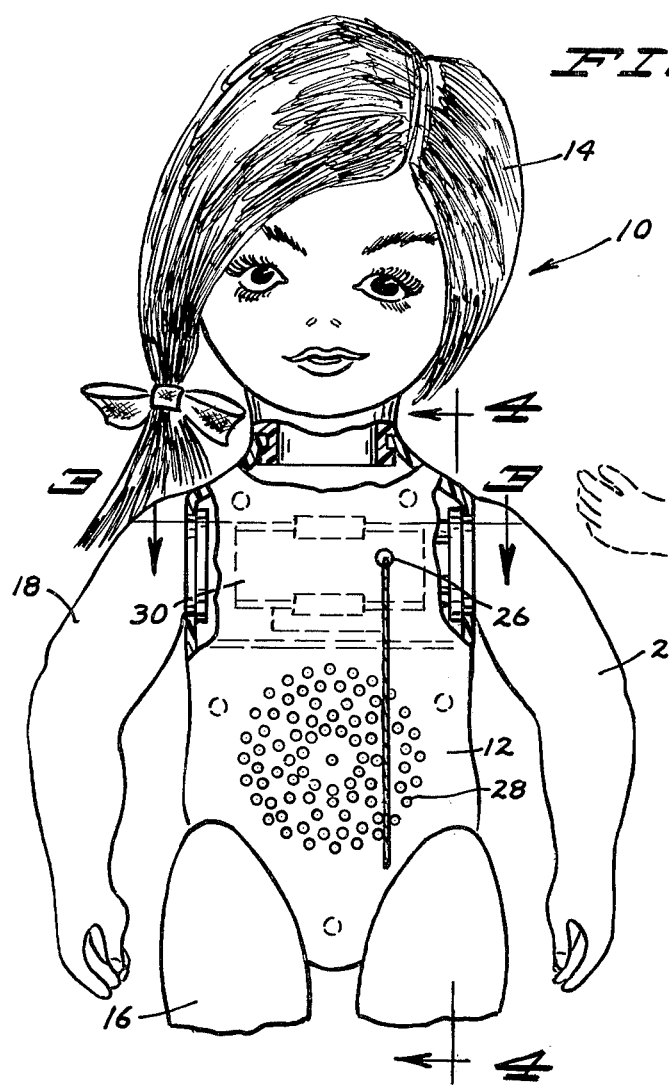
FIG. 1 is a partial front elevational view of a doll embodying our invention.

The figures illustrate a doll 10 as having a hollow torso 12, a head 14, legs 16, a right arm 18, and a left arm 20. The head and appendages are mounted within appropriate openings in the torso in a manner generally well known in the art, so that they are movable relative to the torso. The torso 12 is comprised of a front portion 22 and a rear portion 24, such portions being secured together by appropriate means such as screws (not FIG. 4) so that the torso can, if necessary, be disassembled. The front torso portion 22 is provided with an aperture 26 in the chest region, and a plurality of perforations 28 in the stomach region. At this point, it should be understood that the doll 10 is disclosed merely for illustrative purposes, and it is contemplated that the recording and reproducing apparatus, designated generally by numeral 30, might be used as a separate and complete recording unit per se, or if desired, in a variety of toys other than a doll.

FIGS. 4 and 5 illustrate the various components of the recording and reproducing apparatus 30, within the hollow torso 12. The apparatus includes a mechanical tape deck designated generally by numeral 32; and electrical system which generally includes a combined microphone-loudspeaker 34; a combined record-reproduce head 36; a transistorized amplifier mounted on a circuit board 38; a power source 40; and a switch mechanism 42. The tape deck 32 is positioned in the upper portion of torso 12; the microphone-speaker 34 and the power source 40 are positioned in the lower portion of the torso; and the circuit board 38 and switch 40 are interposed between the other components so that the switch is proximate the tape deck 32. Each of these items will be described in greater detail hereinafter, and their manner of attachment within the torso 12 will be described at that time.

Figure 3:
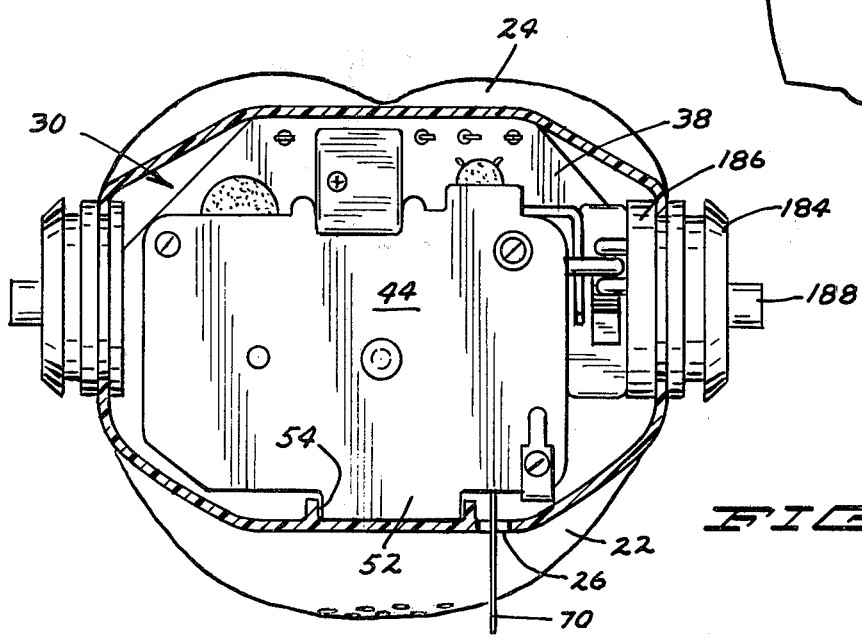
FIG. 3 is a sectional view taken along line 3—3 of FIG. 1, which illustrates a toy tape recorder positioned within the torso of the doll.

As disclosed more fully in FIGS. 8—10, the tape deck 32 is comprised of an irregularly shaped front or first plate 44 and an irregularly shaped back or second plate 46 which are joined together by means of screws 48 positioned within appropriate bores in the first plate 44 so that they threadedly engage posts 50 on the second plate 46. In assembled relationship, the first and second plates, preferably made of a plastic material, form a housing or support structure for the various components with a somewhat rectangular projection 52 along one edge; when the tape deck is mounted within the doll's torso, these projections are positioned within cavities or slots 54 formed in the front torso 22, in this regard note FIGS. 3 and 4 as well. In addition, a shouldered post 56 is provided on the inner surface of the rear torso 24, which bears against the first plate 44. The projections 52, cavities 54, and posts 56 maintain the tape deck 32 in a relatively fixed position within the torso when the front and rear torso portions are connected together.

Figure 14:
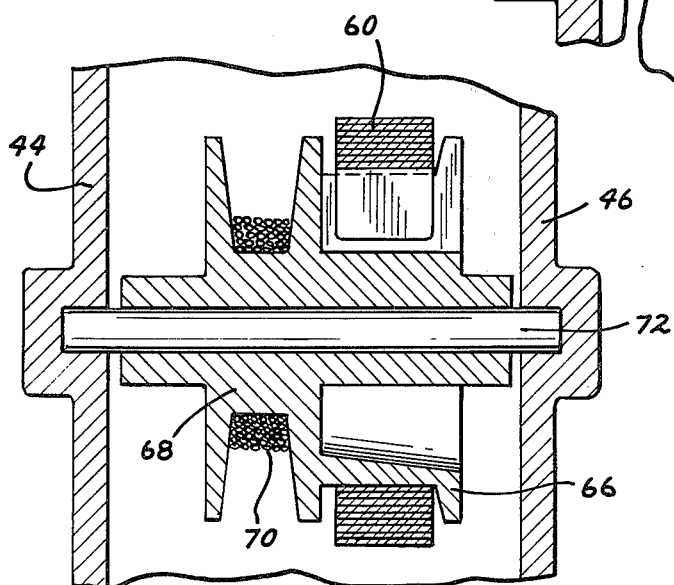
FIG. 14 is a partial sectional view taken along line 14—14 of FIG. 8.

A flat movable recording medium or tape 60, made of magnetizable metal, plastic, paper, or other substance with magnetizable particles contained therein, and having a predetermined length, is secured at one end to a tape wind-up reel 62 and at its other end to a tape storage reel 64. As shown more fully in FIG. 14, the reel 62 is comprised of two components which are integrally connected or joined together; a first reel portion 66 for the magnetic tape 60, and a second reel portion 68 for a drawstring 70 having a ring 58 secured thereto. As viewed in FIGS. 1 and 2, the drawstring 70 extends through the aperture 26. The reel 62 is rotatably mounted on a shaft 72 journaled at its ends in the first and second plates 44 and 46.

Figure 11:
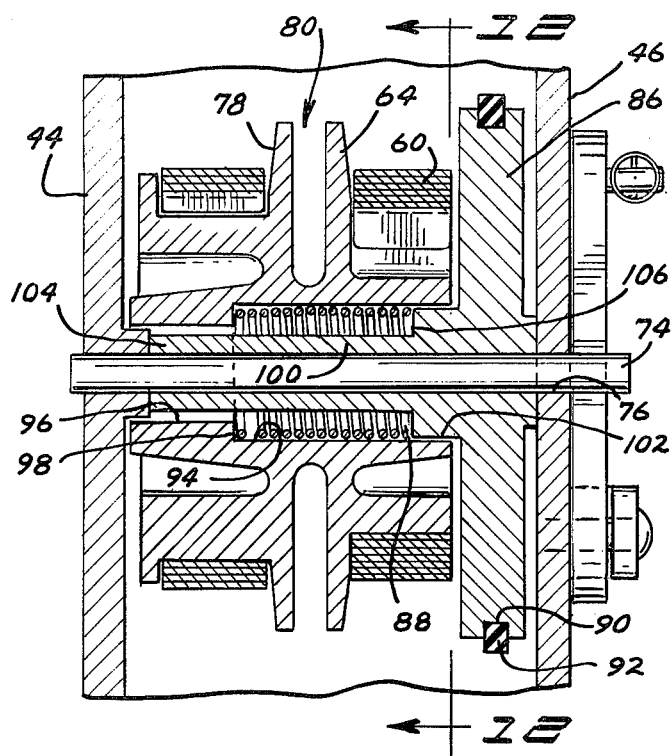
FIG. 11 is a partial sectional view taken along line 11—11 of FIG. 8.

The tape storage reel 64 is rotatably mounted on a shaft 74 in a manner described more fully below, such shaft being rotatably journaled at one end in a bore in the first plate 44, and its other end within a slot 76 in a second plate 46. In this regard, note FIG. 11 as well. As such, the shaft 74 is laterally movable within the slot 76 for a purpose described hereinafter. The tape storage reel 64 is integrally connected to a spring wind-up drum 78 and is separated therefrom by a groove 82, so that rotational movement imparted to either the reel 64 or the drum 78, imparts movement to the other member. For purposes of describing the invention, the combined reel 64 and drum 78 will also be referred to herein as spool 80. The end of the tape 60 is attached to the reel 64 by securing it in a small cavity or slot 84 in the reel 64, by appropriate means (see FIG. 12 as well).

Figure 12:
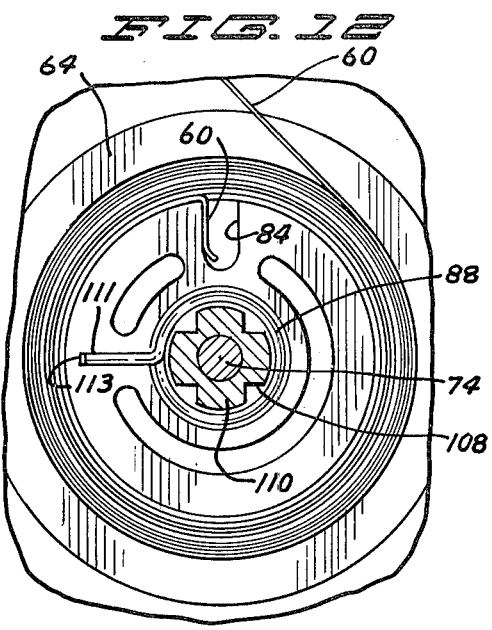
FIG. 12 is a partial sectional view taken along line 12—12 of FIG. 11.

The spool 80, and more specifically, the reel 64, is operatively connected to a circular disc or wheel 86 by means of a one-way clutch mechanism which includes a clutch spring 88. In other words, the tape storage reel 64 in effect, is comprised of two components, i.e., the tape storage section 64 (first component) and the disc 86 (second component). The disc 86 is provided with a peripheral groove 90 which retains a flexible, resilient ring 92 therein. The spool 80 is provided with a cylindrical opening comprised of a first cylindrical bore 94 having a first diameter, which is separated by a shoulder 98 from a second cyclindrical bore 96 having a smaller diameter. The disc 86 is formed as having an integral hub or sleeve 100 which is comprised of a first cylindrical portion 102 proximate the disc 86, and a second elongated generally cyclindrical portion 104 which is smaller in cross-section than the first portion and separated therefrom by a shoulder 106. As shown in FIGS. 10 and 12, the hub portion 100 is provided with a number of longitudinal grooves or valleys 108 which divide the periphery of the hub into lands 110 separated by the valleys 108.

In assembled relationship, the hub 100 is positioned within the bore in the spool 80 so that is surrounds the shaft 74, and the disc 86 is proximate the storage reel 64. The clutch spring 88 is positioned within the bore 94 so that one of its end is proximate the shoulder 98, and its other end 111 is retained within a slot 113 in the reel 64. The spring 88 is wound around the hub 100 with a slight pressure on the land portions 110; as a result, rotational movement of the reel 64 in the direction of the winding causes the spring to tighten further about, or press around, the hub thereby causing the hub and disc 86 to rotate in the same direction as the reel. Rotation of the reel in the opposite direction however, causes the spring 88 to loosen about the shaft, and thus, slide relative to it. The clutch mechanism thus permits the hub 100, and more particularly the disc 86, to rotate in just a single direction, about the axis of the shaft 74.

A spring motor, designated generally by numeral 112, is provided for rotating the tape storage reel 64 in a prescribed direction. Spring motors of this type are generally well known in the art. The motor includes a storage drum 114, mounted for rotation on a shaft 116 so that it is in general alignment with the spring wind-up drum 78, such shaft 116 being fixedly secured to the first plate 44. A coiled constant force spring 118 is wound onto the drum 114 so that its major portion is normally positioned thereon. Constant force springs, also known as non-cumulative force springs, are well known in the art. Generally, they are comprised of a band of highly pre-stressed steel which, when wrapped on wind-up and storage drums, tend to return to their relaxed state on the storage drum, and in so doing, generate a constant torque on the wind-up drum. A first end of the spring 118 is attached to the storage drum 114 by appropriate means, while a second end of the spring is attached to the wind-up drum 78 by appropriate means. Thus, the spring motor in general, includes the storage drum 114, the wind-up drum 78, and the spring 118.

Figure 13:
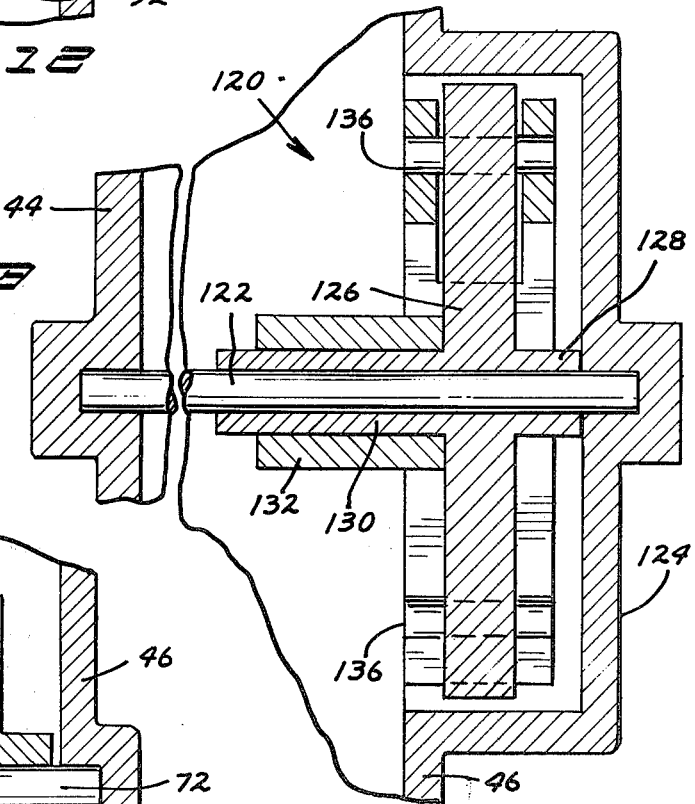
FIG. 13 is a partial sectional view taken along line 13—13 of FIG. 8.

A governor mechanism 120 is provided for controlling the rotational speed of the tape storage reel 64, and consequently the rate of travel of the magnetic tape 60 as it is caused to wind onto the storage reel 64 by means of the spring motor 112. As disclosed in FIGS. 10 and 13, the governor mechanism 120 is mounted on a shaft 122 which is rotatably journaled at one end in the first plate 44, and at its other end in a drum casing 124, such drum casing forming an integral part of the second plate 46. The governor 120 includes an elongated support member 126 having a first integral hub 128 which spaces or separates the support member from the inner surface of the drum casing 124, and a second integral hub 130 which extends toward the first plate 44.

The support member 126 is fixedly secured to the shaft 122 by appropriate means (not shown). A sleeve 132, preferably formed of metal, is positioned over the hub 130 so that it is juxtaposed against the support 126. It must be understood that the sleeve 132 might be formed of plastic, or a flexible resilient material, such as rubber, rather than the metal. Moreover, if preferred, the sleeve could be formed as an integral part of the hub 130. A first pair of cylindrical pins 134 is inserted within bores in the support 126 so that they are diagonally opposed with respect to each other, and a second pair of pins 136 is inserted within bores in the supports that they are likewise diagonally opposed relative to each other. The pins 134 and 136 project from both sides of the support 126, and they are provided for pivotally attaching a pair of weights 138 to the support member. Each weight 138 is provided with a pair of spaced apart hook members 140 which engage the pins 136, and a bifurcation 142 which permits a portion 144 of the support 126 to fit therebetween. A brake lining or pad 146 is secured to each weight 138. As the rotational speed of the shaft 122 increases, the weights 138 are caused to pivot about the pins 136 due to centrifugal force, and the brake linings 146 contact the inner surface of the brake drum 124. The pins 134 act as stops for the weights when rotation of the shaft 122 ceases.

Rotational movement is imparted to the shaft 122 by means of the disc 86, and more specifically, the frictional contact between the flexible ring 92 and the sleeve 132. As pointed out above, one end of the shaft 74 is positioned within the slot 76. An arm 150 having a notch 152 between its ends, and a hook member 154 at one end, is pivotally connected to the second plate 46 by means of a bracket 156 and pin 158. A spring 160 is connected at one end of the hook 154 and at its other end to a pin 162 mounted in the second plate 46. The spring 160 is provided for biasing the shaft 74, and more particularly the disc 86, toward the sleeve 132, so as to provide the frictional contact between the ring 92 and the sleeve 132. A frictional drive of this type, which includes the arm and spring arrangement, permits the shaft 74 to move or float within the slots 76, caused for example, by irregularities in the diameter of the disc 86, variations in the relative thickness of the ring 92, the diameter of the sleeve 132, and the like. Moreover, a drive of this type eliminates the need for a gearing arrangement between the clutch 88 and the shaft 74, and the governor 120. Gearing arrangements often result in the creation of unnecessary noises and chatter, which are picked up during the record cycle, this tends to distort the sound reproduced during playback. It should be recognized that if preferred, the shaft 74 could be journaled in the plate 46 so that it does not float. In other words, both ends of the shaft would be fixed relative to the shaft 122, and the spring 160 and arm 150 would be eliminated.

An erase assembly is provided for erasing or removing a recorded message from the magnetic tape 60, prior to recording a new sound sequence thereon. The erase assembly includes an erase arm 164 comprised of a hub 166, a lever portion 168, and a support arm 170. A support head 172 is secured to the end of the support arm 170, and a permanent magnet 174 is fixedly secured to the support head. The hub 166 is pivotally mounted on a bearing surface 176, which forms a part of a boss 178 integrally connected to the first plate 44. A screw 180, when threadedly inserted in a threaded bore in the bearing surface 176, secures the plate 46 to the boss 178, with the erase arm 164 interposed between the boss 178 and the plate 46, in such a manner that the support head 172 and the magnet 174 are aligned above the magnetic tape 60. A flexible catch mechanism or hook 182, is secured to the plate 46, and it is provided for releasably engaging the lever portion 168 of the erase arm 164, so as to retain it in a fixed position.

The left arm 20 is connected to the torso 12 by means of a plug 184 which in turn is detachable secured to an actuator cam 186, both having generally circular configurations. In this regard, note FIGS. 3 and 5–7. FIG. 6 illustrates the plug and cam as being separated, while FIG. 7 shows them in an assembled condition. The plug 184 is slidable onto a shaft 188 which forms a part of the cam, and it is coupled thereto by means of a pair of flexible detents 190. A slot 192 in the plug 184, and a protrusion (not shown) on a semi-circular web 194, mate with each other so that the plug and the cam rotate or pivot as a unit. A peripheral groove 196 is formed between the plug 184 and the cam 186, within which the front and rear torso are adapted to fit.

The cam 186 is provided for simultaneously actuating the switch 42 and pivoting the erase arm 164. A first pair of spaced-apart projections 198 and 200 are positioned along the outer edge of the cam in such a manner that they project into the torso 12. A second pair of projections 202 and 204 are positioned radially inwardly from the outer edge, and they likewise project into the torso. The projections 202 and 204 have a generally rounded end and they are slightly shorter than the projections 198 and 200. As the cam 186, and more specifically, the left arm 20 is pivoted with respect to the torso 12, the projections 198 and 200 engage and move a slidable projection 206 which forms a part of the switch 42, while the projections 202 and 204 pivot or move the erase arm 164 between erase and non-erase positions.

Reference will now be made to the electrical components of the system. The combined recording and reproducing head 36 is provided for electromagnetically impressing the sound signal picked up by the microphone onto the magnetic tape 60, as well as reproducing the recorded sound therefrom. As illustrated in FIG. 10, the head 36 is secured to the front plate 44 by appropriate means so that it is positioned above and proximate to the magnetic tape 60. A shelf or ledge 208, having curved surfaces 210 at each end, supports a resilient cushion 212 over which the tape 60 slides.

The combined electromagnetic microphone and loud speaker 34 replaces separate microphone and speaker components, thus minimizing the space required, as well as simplifying the operation. Combined units of this type are commercially available and will not be described in detail. The unit 34 is secured to the front torso 22 by positioning it in a cylindrical cavity 214 which effectively aligns the unit with respect to the perforations 28 (see FIG. 4).

The power source 40, comprised of one or more batteries, is positioned within a cavity or compartment 216, secured to the lower portion of the rear torso 24. An aperture 218 permits leads 220 and 222 to project out of the cavity 216 into the torso. A removable cover or plate 224 permits access into the interior of the cavity 216. An appropriate catch mechanism is provided for securing the cover to the torso.

A contact switch 226, comprised of an elongated, flexible leaf 228 and a switch contact member 230, is secured to the bottom of the tape deck 32. As viewed in FIG. 8, the leaf 228 is retained within a pair of openings 232 in the tape deck, and it is designed so that its projecting end 234 is normally biased away from the tape deck. The contact member 230 is secured to the tape deck proximate the projecting end 234 of the leaf 228, and contact between the two members is normally when the leaf is free to bend or flex. When contact is made between the two members, an electrical circuit is completed and the system is energized. An aperture 236 is provided in the deck 32 which is aligned with an aperture 238 in the leaf 228, and the drawstring 70 extends from the reel 68 through the apertures 236 and 238. A knot 240 in the drawstring 70, is adapted to abut against the leaf 228 and urge it away from the contact 230, thus breaking the circuit. The lead 220 electrically connects the contact member 230 to the power source 40.

The circuit board 38 is retained proximate the tape deck 32 by positioning it within slots 242 formed in the front and rear portions of the torso. When the torso 12 is in assembled condition, the circuit board is maintained in a relatively fixed position and the switch 42 is positioned proximate the left arm.

A transistorized amplifier having a printed circuit is used for amplifying the sound during both recording and playback. The printed circuit board 38 operatively connects the various electronic components together, and as disclosed in FIGS. 5 and 15 in particular, it supports the switch 42 as well as a number of resistors R, capacitors C, transistors T, and a diode D. It must be understood that the specific circuit board disclosed herein, as well as the circuit shown in FIG. 16, is merely one of a number of different arrangements which might effectively be used for sound amplification purposes, and the applicants in no way intend to be limited to the use of this particular arrangement, or the specific schematic diagram disclosed in FIG. 16. Moreover, the specific values assigned to each resistor, capacitor, etc. is deemed to be within the knowledge of those skilled in the art; therefore, no specific values will be assigned to these components.

As shown six terminals T1, T2, T3, T4, T5, and T6 are positioned proximate the top edge of the circuit board 38, and they electrically connect the circuit board to the other components of the system. The terminal T1 for example is electrically connected to the leaf switch 228 on the tape deck 32, by a lead 244; the terminal T2 is electrically connected to the power source 40 by the lead 222; the terminals T3 and T5 are electrically connected to the record-reproduce head 36 by leads 246 and 248 respectively; and the terminals T4 and T6 are electrically connected to the microphone-speaker by leads 250 and 252 respectively. The printed circuit on the back side of the circuit board electrically connects the switch 42, the terminals, and the various resistors, capacitors, transistors, and diode together in a prescribed manner so that the desired sound amplification is obtained during both the record cycle and the playback cycle. The switch 42 determines or controls which specific cycle is in use.

Before proceeding further, it might be pointed out that the amplifier circuit illustrated in FIG. 16 is a single transistorized amplifier which is used for both recording and playback. The amplifier, commonly known as an operational amplifier, consists of three direct-coupled stages with overall inverse feedback. In recording, the speaker is used as a microphone and the amplified signal is fed through a resistor into the recording head, thus providing constant-current recording. On playback, the current generated in the head is amplified and fed to the speaker as a voltage signal.

The gain of the amplifier has been set so that in recording the proper level of signal is put on the magnetic tape for correct playback level; a separate gain control is thus unnecessary. Adequate safeguards are provided within the amplifier to prevent oscillation under all conditions of normal operation.

As can be seen in FIG. 16, the operation of the audio system is controlled by the switch 42, which is of a type which can be manipulated between a record, and a reproduce or playback position. As will be explained more fully below, when the apparatus is not being used, the circuitry is not energized; in other words, contact must be made between the leaf 228 and the contact member 230 in order to energize the circuit. When the switch 42 is in the record position, and when the switch 226 is formed by the leaf 228 and the contact member 230 is closed, a circuit is energized by a DC current from the power source 40, e.g., a six volt battery system. An incoming sound signal is received at the microphone-speaker 34 and transmitted via the transistors and the resistor 254 to the record-reproduce head 36, thereby recording the sound signal on the magnetic tape 60. By moving the switch 42 to the playback position, a circuit is completed from the record-reproduce head through the transistors to the speaker 34. The sound signal on the magnetic tape is thus reproduced at the speaker.

Figure 2:
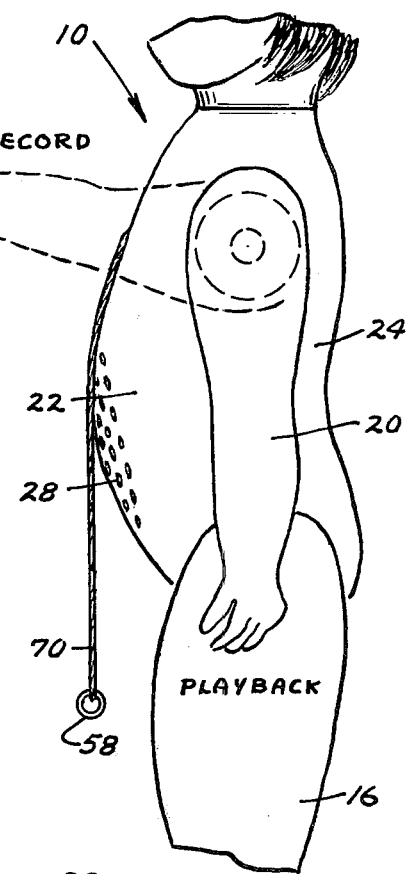
FIG. 2 is a partial side elevational view illustrating the doll.

In operation, assume that the doll 10 has its arm 18 and 20 in a lowered position as shown in FIG. 1, and that it is desired to record a message on the tape recorder. With the arm 20 in this position, the switch 42 is in the playback position, i.e., the switch projection 206 is positioned at playback. The operator, e.g., a child, grasps the left arm 20 and pivots it with respect to the torso to be raised position, this causes the actuator cam 186 to pivot as well. As the cam 186 pivots, the projection 198 engages the top surface of the switch projection 206 and moves it to the record position, and the projection 202 engages the top surface of the erase arm 164 and flips it in a counterclockwise direction (as viewed in FIGS. 6–8) so that the magnet 174 contacts the magnetic tape 60. The apparatus is now in a ready condition for recording.

The child now grasps the ring 58 attached to the pull string 70 and exerts a pulling force on it. As the string is extracted from the doll's torso, the wind-up reel 62 is caused to rotate in a counterclockwise direction (as viewed in FIG. 10) and the tape 60 is transferred from the tape storage reel 64, past the record-reproduce head 36, as well as the magnet 174, onto the first reel portion 66 of the wind-up reel 62. It might be pointed out that magnetic tapes are commercially available which can readily withstand the pulling force required to remove the tape from the storage reel 64 against the biasing action of the spring motor 112. During this sequence, any message previously recorded on the tape is erased. Moreover, the spool 80 is caused to rotate in a counterclockwise direction, and in so doing, the spring 118 is transferred from the storage drum 114 onto the spring wind-up drum 78. It should be noted that the disc 86 does not rotate in a counterclockwise direction, because the one-way clutch spring 88 loosens about the hub 100; as a result, the disc 86 and the governor 120 remain stationary.

As the pull string 70 is withdrawn, the knot 240 separates from the leaf 228, thus permitting the leaf 228 (which is normally biased away from the tape deck 32) to contact the member 230, thus closing the circuit and energizing the electrical components. In other words, the microphone-speaker 34, the record-reproduce head 36, and the transistorized amplifier, are energized, and the apparatus is ready for recording a message.

When the draw string 70 has been fully extracted (or if preferred, to a lesser extent) the string is dropped. The spring motor 112 now causes the spool 80 to rotate in a clockwise direction, because the spring 118 tends to wind itself back onto the storage drum 114. Clockwise rotation of the storage reel 64 causes the tape to move past the record-reproduce head 36 onto the storage reel 64. The disc 86 is also caused to rotate in a clockwise direction, thus actuating the governor 120, which in turn, controls the rate of travel of the tape and prevents it from moving too fast. As this sequence occurs, the child speaks directly into the doll, preferably in the region of the perforations 28. The sound signal is transmitted by the microphone-speaker 34 to the recording head 36, with the assistance of the amplifier, and the sound is electromagnetically impressed on the magnetic tape 60. As the drawstring 70 is wound onto the reel 68, the knot 240 eventually engages the leaf 228 and urges it away from the contact member 230, thus opening the switch 226 and the circuit, thus de-energizing the electrical components. The message is now recorded on the magnetic tape and it can be reproduced or played back.

To playback or reproduce the recorded message, the left arm 20 is lowered to its original position. This causes the cam 186 to pivot so that the projection 200 engages the undersurface of the switch projection 206, thus moving it to the playback position, and permitting the playback circuit to be energized. At the same time, the projection 204 engages the undersurface to the erase arm 164, so as to move it away from the tape 60, and cause it to be engaged by the catch mechanism 182. The apparatus is now in condition for reproducing the pre-recorded message.

Playback is accomplished in substantially the same manner as the recording, in that the string 70 is withdrawn from the doll 10 against the biasing action of the spring motor 112. As the tape 60 returns to the tape storage reel 64, the pre-recorded sound signal is transmitted by the reproduce head 36, with the aid of the amplifier, to the speaker 34 where it is reproduced. The message can be repeatedly played back until such time that it is erased by the magnet 174, in the manner described above in conjunction with the record cycle of the apparatus.

While the invention described above is electromechanical in nature, it requires only a minimum amount of electrical power in its operation. As disclosed, an electrical power source is used to energize only the amplifier system. Known prior art devices utilize appropriate electrical motors for powering or driving the movable tape as well. This of course, requires additional electrical power, and as such, a substantially greater drain on the power source. In this invention, the electrical components are energized only during the time period that the electrical circuit is closed by the switch 226; in other words, only while the draw string is withdrawn during the actual recording or playback. Since the knot 240 on the string 70 urges the switch 228 away from the member 230 when the string is wound on its reel, the circuit is effectively broken most of the time. A battery system will thus normally retain its life for a substantial period of time.

Finally, reference is made to FIG. 17, which illustrates another embodiment for operatively connecting the one-way clutch to the governor. In this embodiment, a belt drive is used in lieu of the friction drive discussed above. For purposes of simplifying the description, the same numerals will be used wherever possible for those elements which are the same as previously disclosed. A circular disc or pulley 260, having a peripheral groove 262, is fixedly connected to the shaft 74, and it is provided with a hub or sleeve 100. The shaft 74 is rotatably journalled in a bore 264 formed in the second plate 46. A second pulley 226, having a peripheral groove 268, is fixedly connected to the shaft 122 so that it is positioned proximate the support member (not shown) of the governor mechanism which is rotatably mounted in the drum casing 124. The pulley 226 is also aligned with respect to the disc 260. The pulley 266 thus replaces the sleeve 132 depicted in FIG. 10. A flexible, resilient belt 270 drivingly connects the pulley 266 to the pulley 260.

In operation, as the shaft 74 is caused to rotate, the pulley 260 likewise rotates. Since the pulley 260 is operatively connected to the pulley 266 by means of the flexible belt 270, the shaft 122 and the governor mechanism are also caused to rotate. This type of arrangement also effectively eliminates the noises and chatter which often occur when gearing arrangements are employed.

In the above description and attached drawings, a disclosure of the principles of this invention is presented, together with some of the specific embodiments by which the invention might be carried out.

Now, therefore, we claim:

1. A recording and reproducing apparatus comprising means for detecting an audible sound signal, a movable recording medium comprising a magnetic tape having first and second ends, sound recording means for magnetically recording the audible sound signal detected by said detecting means, means for operatively connecting said recording means and said sound detecting means together, sound reproducing means for magnetically reproducing the signals from said movable recording medium, a tape deck, means including a constant force spring motor for imparting movement to said magnetic tape, said means permitting relative movement of the magnetic tape in more than one direction, said spring motor being positioned in said tape deck and including a storage drum, a wind-up drum, a spring member having means for attaching one of its ends to the storage drum and its other end to the wind-up drum, said spring member normally biased to wind itself onto said storage drum, a tape storage reel and a tape wind-up reel, said tape storage reel being comprised of two components, clutch means for operatively connecting said two components together, said clutch means including a coil spring which is secured at one end to the first component and which surrounds a hub forming a part of the second component, said coil spring adapted to grip said hub as said first component rotates in one direction, means for connecting said first component to the spring wind-up drum, said first component being rotatable in either direction, said clutch means permitting the second component to rotate in only a single direction, means for securing a first end of said tape to said storage reel and a second end of said tape to said wind-up reel, said tape storage reel and said spring wind-up reel being operatively connected together, governor means for controlling the rate of travel of said magnetic tape, amplifier means for amplifying the sound signal detected by said detecting means and the sound reproduced by said sound reproducing means, manually operable switch means for controlling the recording and reproducing of sound signals on said magnetic tape, means for erasing the recording signal on said magnetic tape, said erasing means comprising a magnet and a movable member for supporting said magnet proximate the magnetic tape, means for actuating said switch means between recording and reproducing positions, and means for actuating said erasing means into an erase position at substantially the same time that the switch means is actuated to said recording position, and a non-erase position at substantially the same time that the switch means is actuated to said reproducing position.

2. The combination of claim 1 wherein said sound detecting means comprises a microphone, said sound reproducing means comprises a speaker, said microphone and said speaker being combined in a single microphone-speaker member, and the sound recording means includes a combined record-reproduce head for electromagnetically impressing the sound signal from the microphone onto the magnetic tape and for subsequently transmitting said signal from the magnetic tape to the speaker.

3. The combination of claim 1 wherein circuit means is operatively associated with said sound detecting means, said sound recording means, said sound reproducing means, said amplifier means, and said switch means, and battery means is provided for energizing said circuit means.

4. The combination of claim 1 wherein the recording and reproducing apparatus is positioned within a toy having an appropriate housing, and the means for actuating the erasing means into an erase position and a non-erase position, and the means for activating said switch means between recording and reproducing positions, are combined into a single member.

5. The combination of claim 4 wherein said toy is a doll and said housing is the torso of said doll, and the means for activating the erasing means and said switch means comprises a pivotable arm of said doll, manipulation of said arm simultaneously actuating said erasing means and said switch means.

6. The combination of claim 5 wherein said arm is pivotally connected to the doll's torso by means including a cam member, said cam member provided with means for simultaneously actuating said erasing means and said switch means.

7. The combination of claim 1 wherein the tape deck includes a support structure, said spring wind-up drum and said tape storage reel are mounted on a common shaft within said support structure, the end of said shaft proximate said drum being journaled in said structure, the other end of said shaft being positioned in a slot in the structure which permits said shaft end to be moved therein.

8. The combination of claim 7 wherein said tape storage reel is operatively connected to the governor means by a resilient, flexible drive whereby rotational movement of said tape storage reel in at least one direction imparts movement of said governor means, said governor means being mounted on a rotatable shaft.

9. The combination of claim 10 wherein said clutch means causing rotational movement to be imparted to said governor means only when the tape is wound from said tape wind-up reel onto said tape storage reel.

10. A recording and reproducing apparatus comprising means for detecting an audible sound signal, a movable recording medium comprising a magnetic tape having first and second ends, sound recording means for recording the audible sound signal detected by said detecting means, means for operatively connecting said recording means and said sound detecting means together, sound reproducing means for reproducing the signals from said movable recording medium, a tape deck, means including a constant force spring motor for imparting movement to said magnetic tape, said means permitting relative movement of the magnetic tape in more than one direction, said spring motor being positioned in said tape deck and including a storage drum, a wind-up drum, a spring member having means for attaching one of its ends to the storage drum and its other end to the wind-up drum, said spring member normally biased to wind itself onto said storage drum, a tape storage reel and a tape wind-up reel, means for securing a first end of said tape to said storage reel and a second end of said tape to said wind-up reel, said tape deck including a support structure, said spring wind-up drum and said tape storage reel being mounted on a common shaft within said support structure, the end of said shaft proximate said drum being journaled in said structure, the other end of said shaft being positioned in a slot in the structure which permits said shaft end to be moved therein, governor means for controlling the rate of travel of said magnetic tape, said tape storage reel being operatively connected to the governor means by a resilient, flexible drive whereby rotational movement of said tape storage reel in at least one direction imparts movement to said governor means, said governor being mounted on a rotatable shaft, said tape storage reel being comprised of two components which are operatively connected together by a one-way clutch means, said clutch means causing rotational movement to be imparted to said governor means only when the tape is wound from said tape wind-up reel onto said tape storage reel, one component of said tape storage reel including a circular disc having a peripheral groove, a resilient, flexible ring positioned within said groove, the periphery of said resilient ring being positioned proximate a portion of said governor shaft so that it frictionally engages said shaft, and means for biasing the common shaft end toward the governor shaft whereby the periphery of said disc contacts said governor shaft, amplifier means for amplifying the sound signal detected by said detecting means and the sound reproduced by said sound reproducing means, switch means for controlling the recording and reproducing of sound signals on said magnetic tape, means for erasing the recording signal on said magentic tape, means for actuating said switch means between recording and reproducing positions, and means for actuating said erasing means into an erase position and a non-erase position.

11. The combination of claim 10 wherein said disc has a substantially larger diameter than the portion of the governor shaft which it contacts.

* * * * *